(12) United States Patent
Simon et al.

(10) Patent No.: US 9,902,493 B2
(45) Date of Patent: Feb. 27, 2018

(54) VTOL AERODYNE WITH SUPPORTING AXIAL BLOWER(S)

(71) Applicant: HUTCHINSON, Paris (FR)

(72) Inventors: Jean-Michel Simon, Chatillon (FR); Christophe Dominiak, Varennes-changy (FR); Sebastien Andre, Montargis (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 15/550,392

(22) PCT Filed: Feb. 8, 2016

(86) PCT No.: PCT/FR2016/050268
§ 371 (c)(1),
(2) Date: Aug. 11, 2017

(87) PCT Pub. No.: WO2016/132040
PCT Pub. Date: Aug. 25, 2016

(65) Prior Publication Data
US 2018/0029703 A1    Feb. 1, 2018

(30) Foreign Application Priority Data
Feb. 16, 2015    (FR) ...................................... 15 51280

(51) Int. Cl.
*B64C 27/08*    (2006.01)
*B64C 29/00*    (2006.01)
(Continued)

(52) U.S. Cl.
CPC ........ *B64C 29/0025* (2013.01); *B64C 39/024* (2013.01); *B64D 35/06* (2013.01);
(Continued)

(58) Field of Classification Search
CPC .............. B64C 39/024; B64C 29/0025; B64C 2201/108; B64C 2201/042; B64C 2201/027; B64D 35/06
See application file for complete search history.

(56) References Cited

U.S. PATENT DOCUMENTS 2,540,404 A * 2/1951 Neale ...................... B64C 27/08
                                                        244/100 R
2,651,480 A * 9/1953 Pullin ..................... B64C 27/08
                                                         244/17.17
(Continued)

FOREIGN PATENT DOCUMENTS

DE    10 2005 003028 A1    7/2006
DE    20 52014 002280 U1   4/2014
WO    2012/063220 A2       5/2012

OTHER PUBLICATIONS

International Search Report, dated May 24, 2016, from corresponding PCT/FR2016/050268 application.

*Primary Examiner* — Medhat Badawi
(74) *Attorney, Agent, or Firm* — Young & Thompson

(57) ABSTRACT

Disclosed is an aerodyne including a supporting structure, to which are connected: at least one supporting axial blower, attached to the supporting structure; at least one main engine driving the supporting blower; at least three attitude blowers controlling roll and pitch, each attitude blower having an electrical motor and being attached, respectively, to one of the elongate arms that are distributed in a laterally, outwardly projecting manner around the supporting structure, to which each arm is connected by an inner end portion, the axis of rotation of each attitude blower being attached relative to the supporting structure, and all the attitude blowers being located outside the space centrally occupied by the supporting blower; at least one battery for supplying power to the electrical motors of the attitude blowers; a (Continued)

landing gear attached under the supporting structure; and a nacelle for holding the battery and a payload.

23 Claims, 11 Drawing Sheets

(51) Int. Cl.
 *B64D 35/06* (2006.01)
 *B64C 39/02* (2006.01)

(52) U.S. Cl.
 CPC .. *B64C 2201/027* (2013.01); *B64C 2201/042* (2013.01); *B64C 2201/044* (2013.01); *B64C 2201/108* (2013.01); *B64C 2201/128* (2013.01); *B64C 2201/162* (2013.01)

(56) References Cited

U.S. PATENT DOCUMENTS

| | | | | |
|---|---|---|---|---|
| 3,002,712 A * | 10/1961 | Beckwith | | B64C 27/20 244/17.23 |
| 3,029,047 A * | 4/1962 | Jacobsen | | B64C 1/063 244/17.11 |
| 3,053,480 A | 9/1962 | Vanderlip | | |
| 3,253,806 A * | 5/1966 | Eickmann | | B64C 27/12 244/17.23 |
| 3,556,438 A * | 1/1971 | Meditz | | B64C 39/026 244/138 A |
| 4,037,807 A * | 7/1977 | Johnston | | B64C 29/02 244/12.1 |
| 4,473,199 A * | 9/1984 | Magill | | B64C 27/06 244/17.11 |
| 4,795,111 A * | 1/1989 | Moller | | B64C 27/00 244/100 R |
| 5,419,513 A | 5/1995 | Flemming, Jr. et al. | | |
| 5,505,407 A | 4/1996 | Chiappetta | | |
| 5,791,592 A * | 8/1998 | Nolan | | B64C 27/14 244/17.11 |
| 6,488,232 B2 * | 12/2002 | Moshier | | B64C 39/026 244/4 A |
| 6,561,456 B1 * | 5/2003 | Devine | | B64C 29/0025 244/12.1 |
| 6,691,949 B2 | 2/2004 | Plump et al. | | |
| 7,168,656 B2 * | 1/2007 | Pai | | B64C 27/10 244/17.23 |
| 7,631,834 B1 * | 12/2009 | Johnson | | B64C 39/024 244/17.11 |
| 7,699,260 B2 * | 4/2010 | Hughey | | B64C 31/028 244/17.11 |
| 7,802,755 B2 * | 9/2010 | Poltorak | | B64C 27/10 244/12.2 |
| 8,052,081 B2 * | 11/2011 | Olm | | B64C 39/024 244/17.23 |
| 8,167,233 B2 * | 5/2012 | Brody | | B64C 27/10 244/17.21 |
| 8,170,728 B2 * | 5/2012 | Roesch | | G05D 1/0858 244/6 |
| 8,256,705 B2 * | 9/2012 | Smith | | B64C 39/024 244/12.1 |
| 8,328,130 B2 * | 12/2012 | Goossen | | B64C 27/20 244/17.11 |
| 8,473,125 B2 * | 6/2013 | Rischmuller | | A63H 27/12 244/17.13 |
| 8,695,919 B2 * | 4/2014 | Shachor | | B64C 39/022 244/17.11 |
| 8,794,564 B2 * | 8/2014 | Hutson | | B64D 45/00 244/17.17 |
| 8,794,566 B2 * | 8/2014 | Hutson | | B64C 39/024 244/17.17 |
| 8,919,691 B2 * | 12/2014 | Lindmark | | B63B 1/041 244/101 |
| 9,051,050 B2 * | 6/2015 | Achtelik | | B64C 27/08 |
| 9,109,575 B2 * | 8/2015 | Weddendorf | | F03D 1/02 |
| 9,187,174 B2 * | 11/2015 | Shaw | | B64C 27/28 |
| 9,260,202 B2 * | 2/2016 | Shachor | | B64C 39/022 |
| 9,388,794 B2 * | 7/2016 | Weddendorf | | F03D 5/00 |
| 9,440,736 B2 * | 9/2016 | Bitar | | B64C 27/12 |
| 9,446,845 B2 * | 9/2016 | Mintchev | | B64C 39/024 |
| 9,457,901 B2 * | 10/2016 | Bertrand | | A63H 27/12 |
| 9,527,588 B1 * | 12/2016 | Rollefstad | | B64C 39/024 |
| 9,573,683 B2 * | 2/2017 | Martin | | B64C 27/50 |
| 9,586,683 B1 * | 3/2017 | Buchmueller | | B64C 39/024 |
| 9,616,994 B2 * | 4/2017 | Kereth | | B64C 27/10 |
| 9,623,969 B2 * | 4/2017 | Nelson | | B64C 39/024 |
| 9,764,829 B1 * | 9/2017 | Beckman | | B64C 27/22 |
| D803,328 S * | 11/2017 | Lee | | D21/441 |
| 2002/0104922 A1 * | 8/2002 | Nakamura | | B64C 27/08 244/17.25 |
| 2005/0061910 A1 * | 3/2005 | Wobben | | B64C 27/20 244/17.23 |
| 2005/0127238 A1 * | 6/2005 | Ballew | | B64C 27/10 244/10 |
| 2006/0226281 A1 * | 10/2006 | Walton | | B64C 27/20 244/17.23 |
| 2007/0158494 A1 * | 7/2007 | Burrage | | B64C 29/0033 244/7 R |
| 2008/0006737 A1 * | 1/2008 | Wobben | | B64C 27/20 244/17.13 |
| 2008/0048065 A1 * | 2/2008 | Kuntz | | A63H 17/00 244/17.23 |
| 2009/0008499 A1 * | 1/2009 | Shaw | | B64C 27/20 244/17.23 |
| 2009/0227415 A1 * | 9/2009 | Buelna | | B64C 29/0033 475/346 |
| 2009/0250549 A1 * | 10/2009 | Wiggerich | | B64C 27/20 244/17.11 |
| 2009/0283629 A1 * | 11/2009 | Kroetsch | | A63H 27/12 244/17.23 |
| 2010/0044499 A1 * | 2/2010 | Dragan | | B64C 1/30 244/17.23 |
| 2010/0243794 A1 * | 9/2010 | Jermyn | | A63H 27/12 244/17.23 |
| 2010/0276549 A1 * | 11/2010 | Karem | | B64C 27/08 244/7 A |
| 2010/0301168 A1 * | 12/2010 | Raposo | | A63H 23/00 244/171.2 |
| 2011/0017865 A1 * | 1/2011 | Achtelik | | B64C 27/08 244/17.23 |
| 2011/0031355 A1 * | 2/2011 | Alvarez Calderon F . | | B64C 3/10 244/7 R |
| 2011/0174920 A1 * | 7/2011 | Yoeli | | B64C 27/20 244/75.1 |
| 2011/0226892 A1 * | 9/2011 | Crowther | | B64C 1/30 244/17.23 |
| 2012/0012692 A1 * | 1/2012 | Kroo | | B64C 29/0025 244/6 |
| 2012/0237341 A1 * | 9/2012 | Simon | | B64C 3/14 415/148 |
| 2012/0241553 A1 * | 9/2012 | Wilke | | B64C 27/08 244/17.13 |
| 2012/0280091 A1 * | 11/2012 | Saiz | | B64C 27/26 244/7 R |
| 2012/0294719 A1 * | 11/2012 | Payne | | B64C 11/001 416/170 R |
| 2013/0020429 A1 * | 1/2013 | Kroo | | B64C 3/16 244/6 |
| 2013/0068876 A1 * | 3/2013 | Radu | | B60F 5/02 244/2 |
| 2013/0068892 A1 * | 3/2013 | Bin Desa | | B64C 39/024 244/190 |
| 2013/0105635 A1 * | 5/2013 | Alzu'bi | | B64C 39/024 244/23 A |
| 2013/0251525 A1 | 9/2013 | Saiz | | |
| 2014/0032034 A1 * | 1/2014 | Raptopoulos | | G08G 5/0069 701/25 |
| 2014/0099853 A1 * | 4/2014 | Condon | | G05D 1/0033 446/37 |

(56) References Cited

U.S. PATENT DOCUMENTS

| | | | | |
|---|---|---|---|---|
| 2014/0117149 A1* | 5/2014 | Zhou | A63H 27/12 | 244/17.23 |
| 2014/0131510 A1* | 5/2014 | Wang | B64C 39/024 | 244/17.23 |
| 2014/0138476 A1* | 5/2014 | Bystrom | B64C 29/0033 | 244/17.13 |
| 2014/0138477 A1* | 5/2014 | Keennon | B64C 27/12 | 244/17.23 |
| 2014/0263823 A1* | 9/2014 | Wang | B64C 39/028 | 244/17.23 |
| 2014/0316243 A1* | 10/2014 | Niedermeyer | A61B 5/7264 | 600/408 |
| 2015/0012154 A1* | 1/2015 | Senkel | B64D 17/80 | 701/4 |
| 2015/0225071 A1* | 8/2015 | Tighe | B64C 29/02 | 244/12.4 |
| 2015/0274286 A1* | 10/2015 | Kereth | B64C 27/10 | 244/17.21 |
| 2016/0016652 A1* | 1/2016 | Barrett | B64C 25/06 | 244/15 |
| 2016/0031554 A1* | 2/2016 | Eshkenazy | B64C 39/024 | 244/6 |
| 2016/0129998 A1* | 5/2016 | Welsh | B64C 39/024 | 244/12.3 |
| 2016/0152316 A1* | 6/2016 | Wang | B64C 39/028 | 244/120 |
| 2016/0229530 A1* | 8/2016 | Welsh | B64C 39/024 | |
| 2016/0236775 A1* | 8/2016 | Eshkenazy | B64C 29/0025 | |
| 2016/0244157 A1* | 8/2016 | Welsh | B64C 11/46 | |
| 2016/0307448 A1* | 10/2016 | Salnikov | A01B 79/02 | |
| 2017/0015417 A1* | 1/2017 | Bishop | B64C 27/20 | |
| 2017/0233069 A1* | 8/2017 | Apkarian | B64C 29/0033 | 244/7 R |
| 2017/0247109 A1* | 8/2017 | Buchmueller | B64C 39/024 | |
| 2017/0269594 A1* | 9/2017 | Sydnor | G05D 1/0077 | |
| 2017/0329324 A1* | 11/2017 | Bachrach | G01C 21/165 | |
| 2017/0330478 A1* | 11/2017 | Zhang | G09B 9/24 | |

* cited by examiner

VTOL AERODYNE WITH SUPPORTING AXIAL BLOWER(S)

The invention relates to a VTOL-type (Vertical Take-Off and Landing) aerodyne, the lift-generation of which is ensured, in particular on take-off and landing, by at least one supporting axial blower, the rotor of which is driven about a substantially vertical axis of rotation.

The aerodyne according to the invention is intended to gain altitude by its own means, without necessarily being connected to the ground by a power supply or a control cable for example. It may be used in particular for transporting payloads, in particular in geographical areas that are difficult to access, in particular with rugged terrains and/or lacking communication infrastructures.

For these reasons, the aerodyne according to the invention must have a relatively simple, but reliable, architecture and be relatively economical to produce, and thus be more suitable than similar aerodynes of the state of the art for the various practical requirements.

In particular, there are significant needs for VTOL aerodynes with a small space requirement on the ground and with limited purchase and utilization costs, capable of transporting loads of the order of 300 kg, over distances of a few tens to a few hundreds of km, the unladen weight of which is limited to 450 kg in Europe and 650 kg in the USA, in order to fall within the category of aerodynes known as ULM (Ultra Light Motorized), with an installed power of the order of 120 to 130 kW for driving the propeller of a supporting blower with a diameter less than 2.5 m.

WO 2012/063220 and US 2013/0251525 describe vertical take-off and landing (known as VTOL) aerodynes comprising:

a supporting structure, to which the following are structurally connected:

at least one supporting axial blower, with an axis of rotation that is substantially vertical and fixed relative to said supporting structure, and capable of ensuring the lift-generation of the aerodyne, at least one motor-lift unit, comprising at least one main drive motor or engine of said supporting blower, at least three attitude blowers, capable of controlling the attitude of the aerodyne in terms of roll and pitch, each attitude blower having an electrical motor, each attitude blower being attached, respectively, to one of a plurality of elongate arms that are distributed in a laterally, outwardly projecting manner around said supporting structure, to which each arm is connected by an end portion called inner, so that the axis of rotation of each attitude blower is attached relative to said supporting structure, and all the attitude blowers are located outside the space centrally occupied by said supporting blower, at least one battery for supplying power to the electrical motors of the attitude blowers, a landing gear, attached under said supporting structure, and at least one nacelle, capable of holding a payload and/or said battery.

The invention proposes an aerodyne of the type presented above, which is characterized in that yaw control flaps, the angle of attack of which can be adjusted, are supported by at least one of the supporting arms of the attitude blowers, and preferably by the supporting arm(s) oriented parallel to the direction of movement of the aerodyne.

Thus, said flaps can effectively ensure the yaw control of the aerodyne, and in particular improve the stability in transverse flight of the aerodyne by this or these said flaps which are supported by the supporting arm(s) oriented parallel to the direction of transverse movement of the aerodyne.

A significant advantage of the invention is that the lift-generating and balancing functions of the aerodyne are fulfilled by separate means, the lift-generation being ensured, in vertical flight configuration, by the supporting blower, the axis of rotation of which is fixed relative to the structure, and the roll and pitch balancing is essentially ensured by the attitude blowers, in all the flight configurations of the aerodyne. It is therefore not necessary to pivot the supporting blower in order to successfully transition between vertical flight (on landing and take-off) and the flight called "horizontal" or in translational motion, this transition always being the weak point of VTOL aerodynes, and production of the transmission connecting the motor-lift unit to the rotor of the supporting blower is thereby considerably simplified, hence increased reliability, and made lighter.

Moreover, advantageously, the centre of gravity of said at least one main drive motor is located vertically below said supporting blower and above the plane formed by propellers of said attitude blowers. Thus the balancing of the attitude of the aerodyne is ensured, rapidly and effectively, by the attitude blowers, at a distance from the centre of gravity of the aerodyne, located on the axis of the supporting blower, by their supporting arms, giving the attitude blowers significant leverage, especially if each attitude blower is attached to the external end of the corresponding supporting arm, so that the electrical motorization of each attitude blower can be ensured by a small rapid and reactive electrical motor, which is easy to control and manage, for example by PWM-type (Pulse Width Modulation) circuits, based on control signals provided by a piloting and navigation unit comprising in particular sensors such as altimeter, accelerometers, and navigational instruments such as gyroscopes, compass, GPS system etc.

Advantageously, the main drive motor of the supporting blower is an internal combustion engine (heat engine). An advantage of this type of engine is that it has a high delivered power to weight ratio, but needs to be supplied with fuel from at least one fuel tank borne by the supporting structure.

Also advantageously, said supporting blower is a blower comprising two coaxial contra-rotating multiblade propellers, with fixed or collectively variable pitch. Advantageously, it can also be protected by a very open fairing (a protection) in order to protect it from external contact, without detracting from a transverse airflow, and this protection is borne by the supporting structure, such that the envelope of said protection does not bear any direct load capable of deforming it and detracting from the correct functioning of the supporting blower.

The attitude blowers may be unfaired. But, advantageously, the attitude blowers are faired blowers so that they can generate a high thrust within a reasonable space requirement, in particular in a situation of failure of the main propulsion. On the other hand, said at least one supporting blower is not faired, but preferably protected by an open protective structure.

Also advantageously, the attitude blowers each comprise two coaxial contra-rotating multiblade propellers, each driven by one of two separate electrical motors, respectively, preferably of approximately equal power, or driven collectively by one or more electrical motors.

A very important point of the invention is that, in order to ensure the survival of the aerodyne, in the event of failure of the main drive motor or engine of the supporting blower, an emergency and/or auxiliary motor, of lower power than that of said at least one main drive motor or engine of said supporting blower, preferably of the order of 25% to 50% of that of said main motor or engine, is associated with said main motor or engine, by a transmission, preferably with clutch(es) and freewheel(s) making it possible to selectively apply the sum of the power of said main motor or engine and of said emergency and/or auxiliary motor to the supporting blower, or, in the case of breakdown of said main motor or engine, the power of the emergency and/or auxiliary motor only, the supporting blower then being assisted by the attitude blowers, the electrical motors of which are dimensioned in order to allow the takeover of the aerodyne with its payload, the attitude blowers then acting as "emergency" blowers.

To this end, the cross-section or total surface area of the attitude blowers is large, and is greater than 35%, and preferably between 60% and 100% of the cross-section or surface area of the supporting blower. This makes it possible to minimize the electrical power necessary for this rescue operation and consequently also the weight of the batteries required to supply power to the electrical motors during the time necessary for the rescue. In particular, when the total cross-section of the attitude blowers is greater than 70% of the surface area of the supporting blower, the weight of the electrical equipment (essentially the electrical motors and the batteries for supplying these motors) can be optimal while keeping a main blower of reasonable size. The emergency and/or auxiliary motor can be a small heat engine or electrical motor. In the latter case, its power and that of the electrical motors of the attitude blowers contribute additional power that is insensitive to altitude during the flight of the aerodyne. The assistance thus procured by the emergency and/or auxiliary motor as well as by the attitude blowers can be decisive in a tricky phase of the flight during an operation at high altitude. Similarly, it is advantageous for the supporting blower driven by the emergency and/or auxiliary motor and the attitude blowers to have power flux densities p'1 and p2 such that $0.5 \times p'1 < p2 < 1.5 \times p'1$, respectively. Thus, these flux densities will have values that are relatively close to one another. The non-linear character of the dimensioning of the electrical motors and batteries must be emphasized here. Below a minimal cross-section of the attitude and emergency blowers the dimensioning may diverge. It is therefore particularly important to respect a dimensioning threshold (70% of the surface area of the supporting blower) when choosing the surface area of the blowers known as emergency and attitude blowers.

Advantageously, said motor-lift unit comprises at least two motors or engines or motor or engine groups having substantially equivalent power, each comprising, in series, before or upstream of a power transmission to the supporting blower, a clutch and a freewheel so that, when a motor or engine or motor or engine group has broken down, the drive of the supporting blower is ensured by the other motor or engine or motor or engine group by "disengaging" the broken-down motor or engine or motor or engine group.

In this case, advantageously, the two motors or engines or motor or engine groups are managed by a "master-slave" type control.

Advantageously in this case, on the one hand, the two heat engines have substantially equivalent power and, on the other hand, the cross-section or total surface area of the attitude blowers is greater than 70% of the cross-section or surface area of the supporting blower, in order, as in the previous situation, to minimize at the same time the electrical power and the weight of the batteries required to manage this situation.

In an architecture with two motors or engines or motor or engine groups in the power train, and when the supporting blower comprises two coaxial contra-rotating multiblade propellers, each motor or engine or each motor or engine group can advantageously drive one of said two propellers respectively, thus avoiding a contra-rotating transmission.

At this stage of the disclosure and for better understanding of the benefit of the original architecture proposed for the aerodyne, the following points must be detailed:

For equal motor or engine power and diameter of the blower, a substantially greater thrust is obtained by "fairing" the blowers. The gain in thrust can be greater than 30% relative to a blower that is unfaired. For this reason, many small-size crafts such as "UAVs" are proposed with fairings. See for example: U.S. Pat. No. 5,419,513 A (United Technologies Corp.) or U.S. Pat. No. 6,691,949 B2 (Plump et al.)

However, in the presence of a side wind, by imposing on the airflow a fixed, substantially vertical direction, the faired blowers are subjected to a significant lateral force called "momentum drag", the intensity of which is proportional to the airflow of the faired blower and to the speed of the side wind, and the application point of which is located above the plane of the faired blower, which generates "pitch-up" on the faired blower.

In order to counter the undesirable effects of this so-called pitch-up, the main solution consists of placing the centre of gravity of the aerodyne substantially above the plane of the faired blower so as to reduce the "leverage" of the pitch-up. This is what is done in small UAVs using this system.

It will be immediately understood that in the case of large-diameter blowers such as the supporting blower, this option is no longer applicable: the airflow is high, therefore the pitch-up torque is very large, and it would be very difficult to place the centre of gravity above the plane of said supporting blower because this would require both the motor and the payload to be placed above the plane of the supporting blower.

As will be seen hereinafter, the proposed architecture of the aerodyne, in which the supporting blower is unfaired, the attitude (and emergency) blowers are faired in order to reduce the consumption of electricity, and the centre of gravity is placed below the supporting blower and at the level of, or above, the fairings of the attitude blowers, offers a novel, high-performance compromise for aerial transfer of loads.

In a first main embodiment, the supporting blower comprises two coaxial multiblade propellers contra-rotating about their common axis of rotation. This allows each of the two contra-rotating propellers to balance the rotational torque of the other. But, in order to economize on one propeller and on the contra-rotating drive of the two propellers, which can be a factor in complexity and cost, according to a second embodiment, the supporting blower comprises at least one multiblade propeller, preferably a single multiblade propeller. The single or double, contra-rotating propellers of the supporting blower have either a fixed pitch or a variable collective pitch. In fact, unlike helicopters, the presence of attitude blowers means that there is no need to have a cyclical pitch control on the propellers.

Again advantageously, downstream of the multiblade propeller(s) of said supporting blower, said flaps, the angle of attack of which can be adjusted for controlling the yaw, are capable of adjusting the righting of the airflow at the output of said supporting blower. Thus, this set of flaps makes it possible to adapt the righting torque to the variations in the torque in response to the drive torque of said propeller(s).

In the case where the supporting blower comprises only one multiblade propeller, with a fixed pitch or a variable pitch, without righting means, advantageously at least some of said flaps, the angle of attack of which can be adjusted for controlling the yaw and supported by at least one of the supporting arms of the attitude blowers, balance the motor or engine torque.

In all the embodiments and all the variants presented above, advantageously the faired attitude blowers are attached to their supporting arms such that the centres of thrust of said attitude blowers are substantially in a horizontal plane substantially below the centre of gravity of the aerodyne, so that the aforesaid momentum drag, which is exerted on the fairing of the attitude blowers in a side wind situation, has little importance, because its leverage is small relative to the centre of gravity of the aerodyne. It can thus easily be brought under control (compensated for) by the torque exerted by said attitude blowers.

Alternatively, when the aerodyne is intended to be used in the presence of very strong winds, attitude blowers that are unfaired can be used, consequently with a reduced payload, but otherwise unchanged (same motor, same space requirement).

In order to reduce the space requirement of the aerodyne on the ground, when it is out of service, and/or in order to facilitate its transport, the supporting arms of the attitude blowers can be folded and/or removed, when the aerodyne has been landed.

Advantageously, the disc loading of the supporting blower (T/A1) is comprised between 450 N/m2 and 750 N/m2.

Advantageously, electrical and electronic components of the aerodyne, comprising at least the electrical motors and power supply batteries of the attitude blowers, as well as controllers for controlling the motors, connectors connecting said batteries to said motors and at least one alternator for recharging batteries are grouped together in a closed enclosure, preferably thermostatically controlled, arranged in a substantially central area of said supporting structure, and connected to each attitude blower, for driving its propeller or propellers, by a rotating-shaft mechanical transmission preferably comprising a universal joint connection allowing at least a portion of said rotating shaft to be folded or hinged back with at least a portion of said corresponding supporting arm, relative to said supporting structure.

In order to achieve good control of the aerodyne in flight, advantageously, an attitude blower supporting arm located in a plane defined by the axis of rotation of the supporting blower and by the axis of movement of the aerodyne and behind the aerodyne also bears a horizontal empennage, and if necessary a vertical empennage. The aerodyne is thus arranged so as to ease the work of said attitude blower in a situation of longitudinal movement of the aerodyne with its horizontal empennage and to orientate the aerodyne in the direction of the movement, or of the relative wind, with the vertical empennage.

In order to improve the aerodynamic performance of the aerodyne, advantageously, the upstream peripheral portion of the fairing of said attitude blowers bulges radially outwards on its periphery with a rounded convex profile, capable of reducing the drag coefficient relative to a lateral relative wind, the downstream portion of said fairing having an outer face that is substantially cylindrical with a circular cross-section.

Other features and advantages of the invention will become apparent from the non-limitative description given below of embodiments described with reference to the attached drawings, in which:

FIG. 1 is a perspective view of an example of an aerodyne according to the invention equipped with a supporting blower driven by a heat motor and stabilized by four faired electrical blowers, supported by four arms, of which two are equipped with yaw stabilization flaps;

FIG. 2 is a top view of the aerodyne in FIG. 1;

FIG. 3 is a bottom view of another example of an aerodyne of the same type, but comprising three faired electrical blowers only, supported by three arms;

FIG. 4 is a lateral elevation view of an aerodyne according to the invention in horizontal movement;

FIG. 5 is a side view of an aerodyne according to the invention with a suspended payload;

FIG. 6 is a diagrammatic cross-section view of an electrical blower with fairing;

FIG. 7 is a diagrammatic cross-section view of an electrical blower without fairing;

FIGS. 8 and 8a are respectively a side view of an aerodyne according to the invention with yaw control flaps and a cross-section view (along Xa in FIG. 8) of a yaw control flap;

FIGS. 9 and 9a are respectively a side view of an aerodyne according to the invention equipped with a single-propeller supporting blower and an anti-torque control by said yaw control flaps and a cross-section view of a flap;

FIGS. 10 and 11 are top views of an aerodyne according to the invention with empennage and yaw control flaps in a version with four (FIG. 10) and three (FIG. 11) electrical blowers respectively;

FIG. 12 is a diagrammatic view of a supporting blower with a power train having two motors and an electrical blower;

FIG. 13 is a diagram showing the change in an index proportional to the weight of the set of electrical equipment as a function of the choice of the ratio of surface areas between the surface area of the electrical blowers and that of the supporting blower;

FIG. 14 is a diagrammatic view similar to FIG. 12 of a supporting blower with a power train having two motors and an electrical blower;

FIG. 15 is a diagram showing exclusion areas as a function of the choices of rotor load (T/A1) and of the ratio of surface areas between the electrical blowers and the main blower (A2/A1);

FIG. 16 is a diagrammatic cross-section view of an aerodyne according to the invention equipped with a supporting blower with two contra-rotating propellers each driven by one of two separate power trains respectively, with electrical blowers having two contra-rotating propellers and yaw control flaps;

FIG. 17 is a diagrammatic view similar to FIG. 14, and shows a power train group with a supporting blower having two contra-rotating propellers and an attitude blower of the aerodyne, with a similar design to that in FIG. 16; and FIG. 18 is a diagrammatic view similar to that in FIG. 17, but with four drive motors of the supporting blower instead of two, and an attitude blower that is unfaired.

DESCRIPTION OF THE FIGURES

In the attached figures, the same alphanumeric references denote identical or similar elements, or ones which fulfil the same functions.

Terms such as "vertical", "horizontal", "above", "below" and others used in order to indicate relative positions of elements should not be understood in their absolute sense, but are used in the following description to describe the aerodyne and its components when it is placed on a flat, horizontal ground, after landing or before its vertical take-off.

Figure 1:
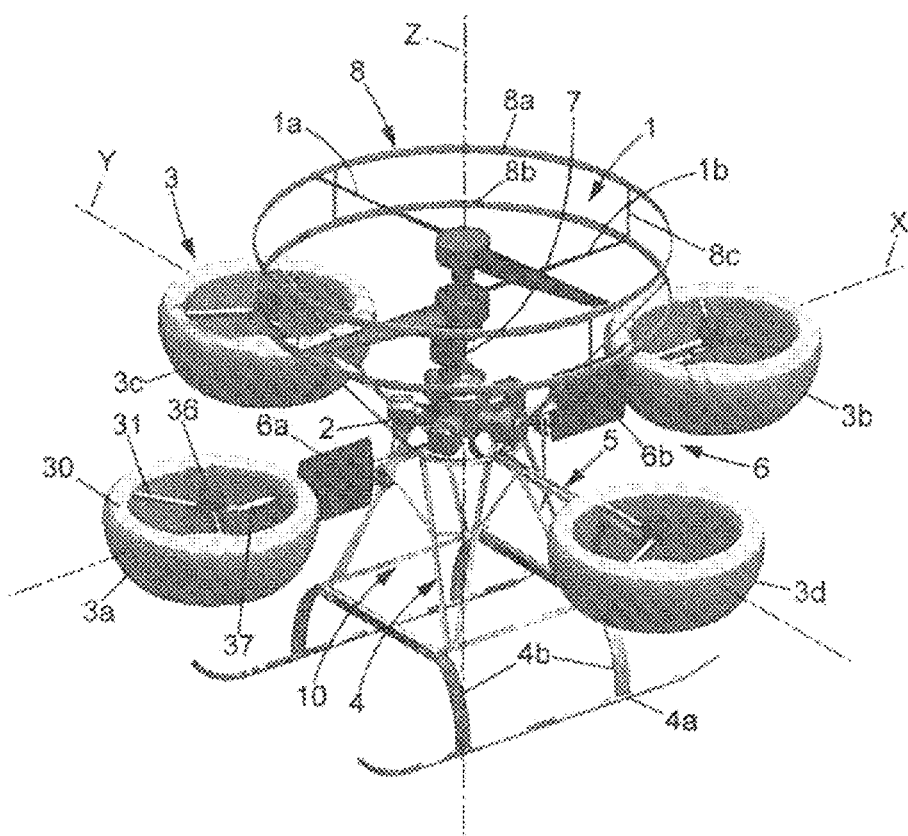
FIG. 1 is a perspective view of a first example of an aerodyne according to the invention, a top view of which is shown in FIG. 2, and which is equipped on the upper portion with an axial supporting or lift-generating blower 1, with a vertical Z axis, preferably protected by a very open light protective structure 8, and driven by a heat motor 2, which in this example is a radial "star" internal combustion engine, borne below the supporting blower 1 by a supporting structure 4, which also bears the supporting blower 1, and which is equipped with a landing gear, in this example with two parallel, horizontal skids 4a, each attached respectively to the lower end of two or four legs 4b capable of elastic deformation, firmly fixed by their upper end portion to the supporting structure 4. The aerodyne is stabilized in terms of roll and pitch by a plurality of axial attitude blowers 3, which in this example comprise four identical faired electrical blowers 3a, 3b, 3c and 3d, each supported respectively by one of four substantially horizontal arms 5 that are radial relative to the Z axis, attached to the supporting structure 4 and distributed in a laterally, outwardly projecting manner around this supporting structure 4. At least two of the arms 5 are equipped with flaps 6, the angle of attack of which can be oriented, for stabilizing the aerodyne in terms of yaw, about the yaw axis, which is the vertical Z axis of the supporting blower 1, fixed relative to the supporting structure 4. Similarly, the attitude blowers 3 are fixed relative to the supporting structure 4, and the axes of rotation of their propellers are parallel to each other and to the Z axis. The attitude blowers 3 are each borne at the outer radial end portion of a corresponding arm 5, attached to the supporting structure 4 by its inner radial end portion, so that all the attitude blowers 3 are located outside of and around the space centrally occupied by the supporting blower 1, the engine 2 and the supporting structure 4, which delimits a nacelle 10, below the engine 2 and the arms 5, for holding a payload and accommodating the fuel tank (not shown) supplying the engine 2 and the electrical battery or batteries (also not shown) supplying power to the electrical motors driving the propeller(s) of the attitude blowers 3.

In this example, each attitude blower 3, such as the blower 3a, comprises an annular fairing 30, within which a three-blade propeller 31 is driven in rotation by an electrical motor 36 borne at the centre of the fairing 30 and centred on the axis of rotation of the propeller 31 by a support and supply arm 37.

The aim of the invention is to design an aerodyne that can handle significant loads, several tens, or even hundreds of kilograms, for a reasonably long time, exceeding one hour, while retaining good stability in side wind gusts, excellent maneuverability with very short reaction times as well as a high level of safety in the event of breakdown, in particular breakdown of the engine 2. In order to achieve this aim, the lift-generating function is ensured by the supporting blower 1 which comprises two coaxial two-blade propellers 1a and 1b, contra-rotating about the Z axis, with fixed or collective pitch, and unfaired. For the sake of simplicity, any collective pitch controls of the propellers have not been shown in the figures. On the other hand, a cyclical pitch control is complex and unnecessary, because this function is fulfilled by the attitude blowers.

The high level of performance of contra-rotating propellers is known, in particular those used in helicopters such as the Russian "Kamov" helicopters. The ability to carry heavier loads, compactness, better stability associated with symmetry of lift, reduced sensitivity to gusts of wind, enhanced performance (flight ceiling, rate of climb, etc.) are major advantages of contra-rotating propellers. However, it must be recognized that this principle is not widespread. In fact, the mechanical complexity of two contra-rotating propellers each equipped with variable pitch and swash plates has discouraged most helicopter manufacturers. In the case of the aerodyne that is the subject of the invention, this contradiction is resolved, in the supporting blower 1, by the joint use of two contra-rotating propellers 1a and 1b, the pitch of which is fixed or collectively variable, and which are not provided with swash plates, and therefore are very simple, and electrical attitude blowers 3a, 3b, 3c, 3d supported by arms 5 that are so long that the stabilization torque exerted by said electrical blowers 3a, 3b, 3c, 3d is large, but without requiring powerful electrical motors 36, which would consume too much electrical power and would require heavy batteries to be carried, which would be detrimental to the payload of the aerodyne.

In order to meet the sought requirement to handle heavy loads over a long period of time, while retaining maneuverability and good stability, in particular in gusts of wind, the aerodyne that is the subject of the invention is, on the one hand, motorized at the level of the supporting blower 1 by one or more internal combustion engines 2 of the heat engine type (two- or four-stroke, or of the Wankel motor rotary-piston type, etc.), or of the gas turbine type, which is known to have excellent power-to-weight and weight-to-endurance ratios, and, on the other hand, at the level of the attitude or stabilization blowers 3a, 3b, 3c, 3d by electrical motors 36, which are also known to be excellent for flexibility, precision and rapidity of response. The major drawback of electrical motors is the weight of the motor+batteries assembly. The length of the supporting arms 5 is an element for limiting the power of the electrical motors 36, but it is explained hereinafter that it is also essential to choose the diameter of the rotors or propellers of the electrical blowers carefully, and in particular the ratio of the total surface area A1 of the rotors or propellers 31 of the electrical blowers 3a, 3b, 3c, 3d to the surface area A0 of the rotor(s) or propeller(s) 1a and 1b of the supporting blower 1. Power transmission between the heat engine(s) 2 and said supporting blower 1 is carried out by a contra-rotating transmission 7.

One of the major features of the aerodyne according to the invention concerns the safety in the case of breakdown, in particular of the engine or an engine 2 of said supporting blower 1. To this end, the stabilization blowers 3a, 3b, 3c, 3d are dimensioned in order to contribute significantly to the lift of the aerodyne in a failure situation, and these blowers alone can be capable of supporting as a minimum the weight of the structure of the aerodyne, i.e. without its payload. This is possible, on the one hand, because this situation does not last for a long time (rapid landing, autonomy for several minutes), and on the other hand because the choice was made to dimension the rotors or propellers 31 of the stabilization blowers 3a, 3b, 3c, 3d which, in this case, are emergency or survival blowers in this situation, adequately, as explained hereinafter with reference in particular to FIG. 13, and finally because said attitude and survival blowers, in this situation, are either fully faired 30 as in FIG. 1 or themselves produced with free contra-rotating propellers as in FIG. 16 or with a combination of contra-rotating and faired propellers as in FIG. 17, so that their lift-generating thrust efficiency is excellent.

Figure 2:
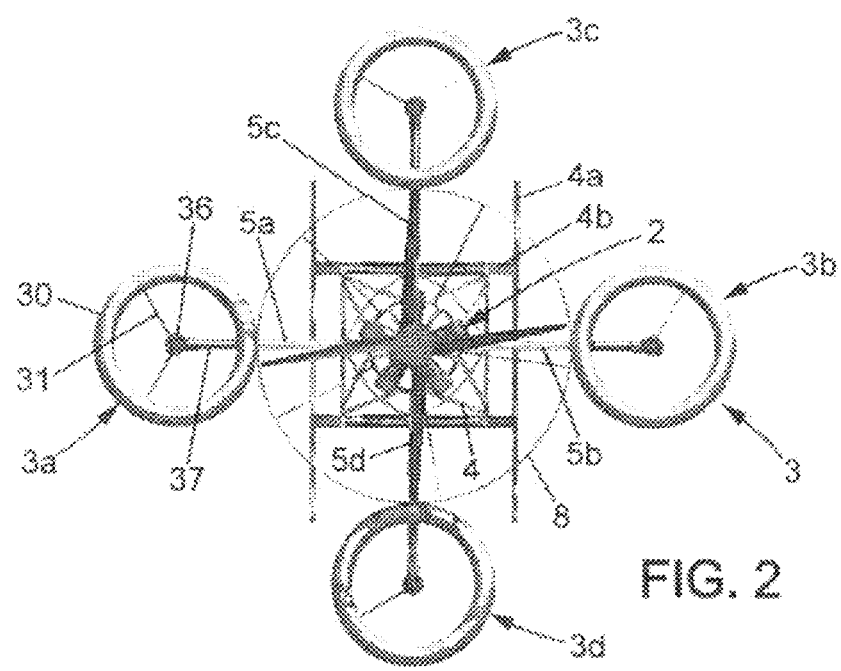
Figure 3:
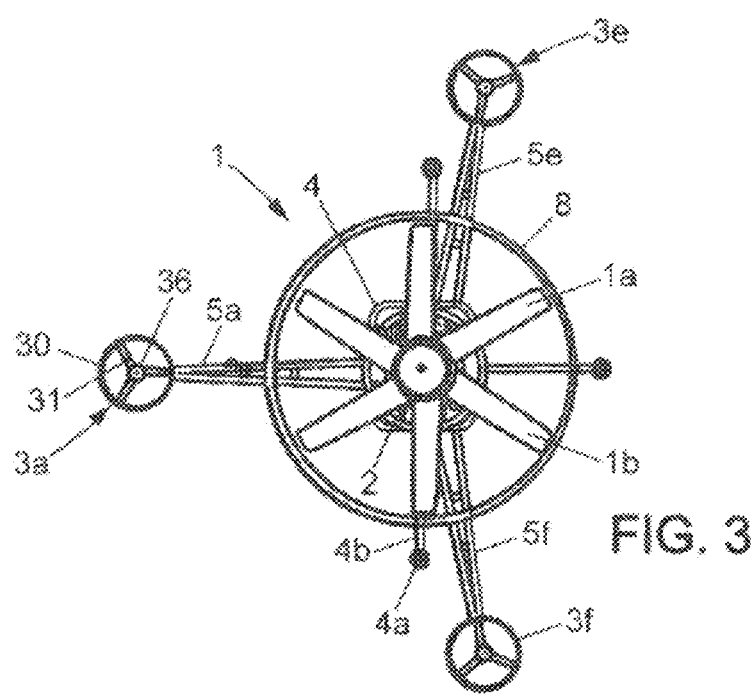

In order to be perfectly effective in all situations, it is preferable for said stabilization and/or survival blowers 3a, 3b, 3c, 3d to be placed as a minimum outside the projected circle of said supporting blower 1, as can be seen clearly in FIG. 2, or even further off-centre as in FIG. 3.

In the example of FIGS. 1 and 2, the four attitude blowers are distributed in two pairs of blowers diametrically opposed on each side of the Z axis, as 3a and 3b in one pair and 3c and 3d in the other, the horizontal axis passing through the centres of the blowers 3a and 3b being the roll axis X perpendicular to the Z axis and the horizontal axis passing through the centres of the blowers 3c and 3d being the pitch axis Y of the aerodyne, perpendicular to the Z and X axes. The yaw control flaps 6 are two flaps 6a and 6b each mounted pivoting in terms of angle of attack about one of the arms 5a and 5b respectively of the blowers 3a and 3b, in the outward airflow from the supporting blower 1.

In addition, the skids 4a of the landing gear are parallel to the X axis. As a variant, the skids 4a can be equipped with castors, or replaced with castors.

Another major feature of the invention is that, in the case where said survival or stabilization blowers 3a, 3b, 3c, 3d are faired, the centre of gravity of the drive engine(s) 2 of the supporting blower 1 is located vertically below said supporting blower 1 and above the upper plane of the air intake of the fairing 30 of said survival or stabilization blowers 3a, 3b, 3c, 3d, so as to position the centre of gravity of the aerodyne vertically close to the air intakes of said stabilization blowers 3a, 3b, 3c, 3d and therefore to minimize the torque exerted by the momentum drag in a side wind situation as explained above. It must be noted that this is only made possible by the choice of architecture made for this aerodyne. In fact, for example, if it had been desired to fair the main supporting blower 1, it would have been in practice very difficult, or even impossible, to position the centre of gravity above the air intake of said supporting blower 1 as is done in certain drones.

Finally, the supporting structure 4 of the aerodyne according to the invention is preferably produced in the form of a tubular truss, and the protection 8 of the supporting structure 1 is constituted by two rigid circular hoops of the same diameter, coaxial about the Z axis, and parallel to one another perpendicularly to the Z axis, and the upper hoop 8a is rigidly connected to the lower hoop 8b by four axial struts 8c, distributed over the periphery of the protection 8, very open and delimiting a cylindrical space inside which the propellers 1a and 1b of the supporting blower 1 rotate. For reasons of clarity, the payload as well as its attachment to the supporting structure 4 have not been shown in FIGS. 1 and 2.

FIG. 3 is a top view of a second example of an aerodyne according to the invention, similar to the one in FIGS. 1 and 2 except that it only has three arms 5a, 5e, 5f and three stabilization electrical blowers 3a, 3e, 3f, and that the contra-rotating propellers 1a and 1b of the supporting blower 1 are three-blade propellers instead of two-blade propellers. In this respect, it is emphasized here that the two contra-rotating propellers can each have two, three or n blades and that, on the one hand, they do not necessarily have the same number of blades and, on the other hand, they can have different diameters.

Figure 4:
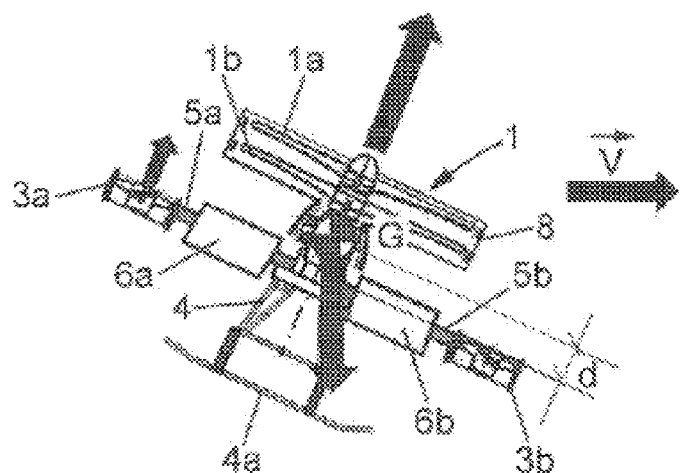

FIG. 4 is a profile view of another example of an aerodyne according to the invention, having a configuration similar to that in FIGS. 1 and 2, during horizontal progression at a speed of $\vec{V}$. The impulsive tilt is given by one of the stabilization blowers, 3a for example. As explained for FIG. 1, it is apparent that the centre of gravity G is located below the supporting blower 1 and above, at a distance d, the air intake plane of the fairings of said stabilization blowers 3a, 3b, 3c, 3d.

Figure 5:
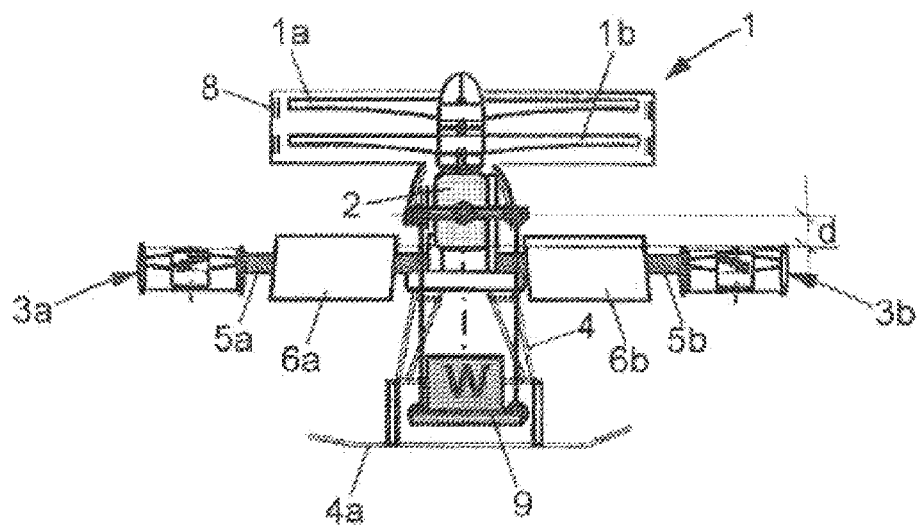

FIG. 5 is a side view of yet another example of an aerodyne according to the invention, with a payload W suspended by a hinged assembly 9 which can deploy like a hinged parallelogram in the X-Z plane and in the Y-Z plane with an angular limitation provided by damped stops for example, which allows it to deploy through ±25° in the two aforementioned planes, and having a hinged attachment on its upper portion in an area close to the centre of gravity of the aerodyne without payload, so as to maintain a relatively stable position of the centre of gravity regardless of the load and the tilt of the aerodyne (within the limit of ±25°).

Figure 6:
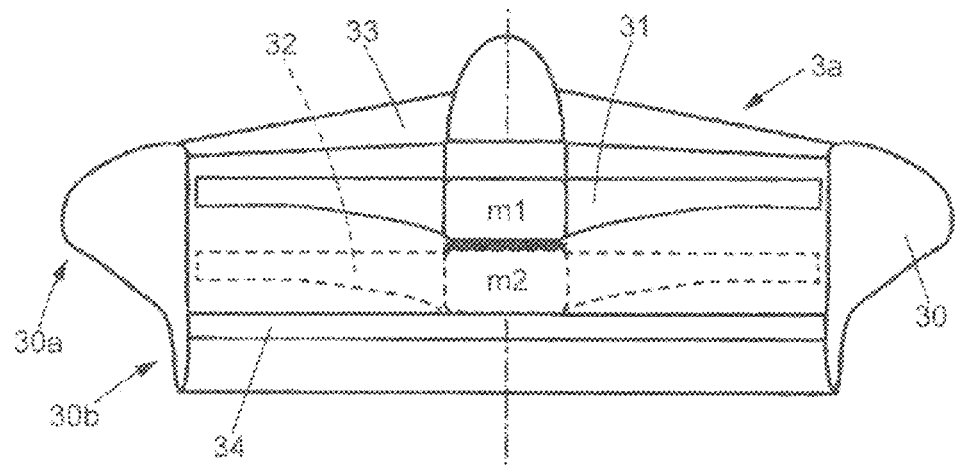
Figure 7:
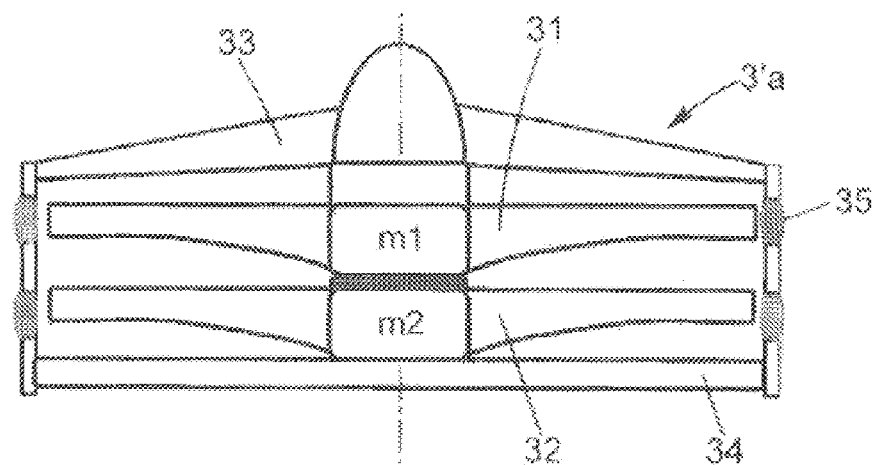

FIGS. 6 and 7 represent two diagrammatic cross-section views of an electrical stabilization and/or emergency blower.

FIG. 6 shows a faired blower 3a and FIG. 7 a variant 3'a that is unfaired. In the faired version in FIG. 6, said stabilization and/or emergency blower 3a comprises a fairing 30, upper 33 and lower 34 radial arms holding the fairing 30 and a minimum of one multi-blade propeller 31, called upper because it is accommodated in the high or upstream portion of the fairing 30, and driven by an electrical motor m1. If necessary, in order to further improve the performance, it is possible to add thereto a second, lower multi-blade propeller 32 (shown in dotted lines in FIG. 6) that is contra-rotating with respect to the upper propeller 31 and itself driven by another electrical motor m2. In order to improve the aerodynamic performance of the aerodyne, advantageously, the upstream peripheral portion 30a of the fairing 30 of said stabilization and/or emergency electrical blower 3a bulges radially outwards on its periphery following a rounded convex profile, capable of reducing the drag coefficient relative to a lateral relative wind, the downstream portion 30b of said fairing having an outer face that is substantially cylindrical with a circular cross-section.

FIG. 7 shows substantially the same attitude blower 3'a with a simple impact protection 35, for example similar to the protection 8 of the supporting blower 1, and its upper 33 and lower 34 fastening arms. The protection 35 must be very transparent to a side wind, and its only function is simply to prevent direct contact of a propeller 31 or 32 with a side obstacle. But in this embodiment, in order to maintain efficient lift-generation, in particular in a survival situation, in which the electrical blowers such as 3'a play a determining role in the rescue of the aerodyne, it is highly beneficial to have a second contra-rotating multiblade propeller 32 driven by a motor m2.

Figure 8:
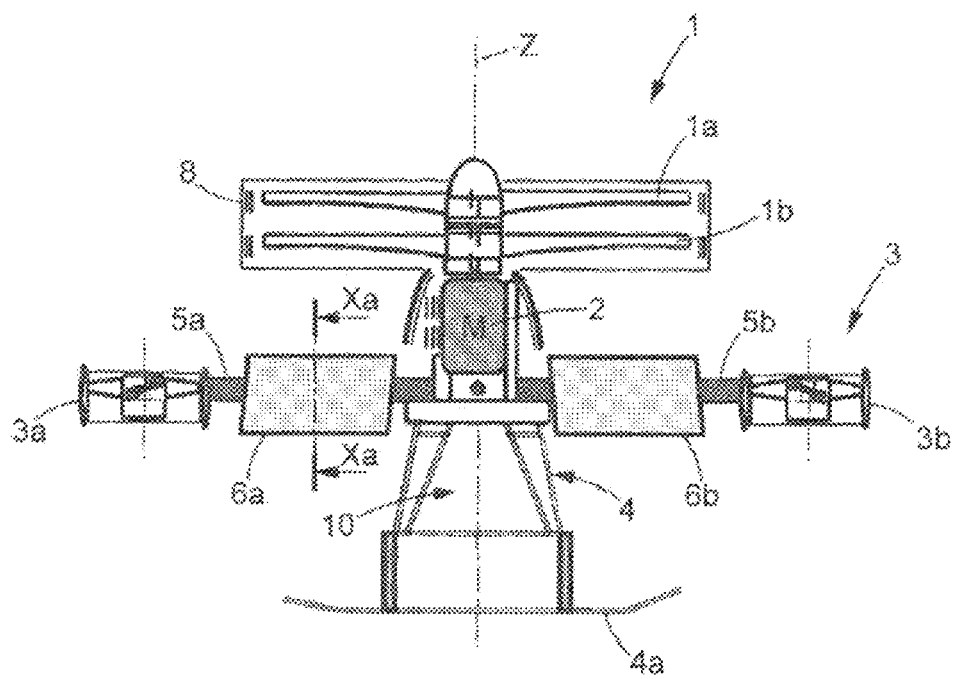
Figure 8A:
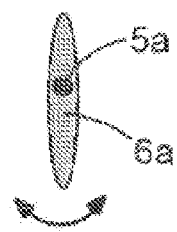

FIG. 8 is a side view of an aerodyne according to the invention, similar to the one in FIG. 4, with, in particular, flaps 6a and 6b supported by the arms 5a and 5b and hinged about the latter, while being controlled for angle of attack, as can be seen in the section Xa-Xa in FIG. 8a. The flaps 6a, 6b have to be placed in the outlet airflow of the supporting blower 1, and mainly serve to control the yaw of the aerodyne about the vertical Z axis. The flaps 6a and 6b are supported by at least one arm 5, or by two opposite arms, such as 5a and 5b, or by the four arms (or three, if there are only three arms because there are only three attitude blowers 3). In the case where two opposite flaps 6a and 6b, for example, are actuated in rotation in opposite directions, the flaps serve to control the yaw in one direction or the other, according to the tilt. In the case where the flaps are actuated in rotation in the same direction, they can serve to produce a pitch or roll angle according to the pair of flaps actuated, supporting the action of the electrical stabilization blowers 3a to 3d, and then to maintain this roll or pitch angle if necessary in order to ease the work of the electrical blowers 3a to 3d, and especially the load on the batteries. For example, in FIG. 8, if the forward X axis of the aerodyne is defined by the arms 5a and 5b as in FIG. 1, this X axis is the roll axis, and the Y axis perpendicular to the plane of the figure, and defined by the arms 5c and 5d (not shown), is the pitch axis. In this case, if the flaps 6a and 6b pivot together, they will cause roll to the right or to the left according to their direction of pivoting, by lift response in the airflow of the blower 1, and if they pivot in opposite directions, they will cause yaw in one direction or the other about the vertical Z axis. Similarly for the flaps 6c and 6d which would be supported by the arms 5c and 5d (not shown in FIG. 8), which will cause pitch about the Y axis by pivoting together and yaw about the Z axis by opposite pivoting movements.

Figure 9:
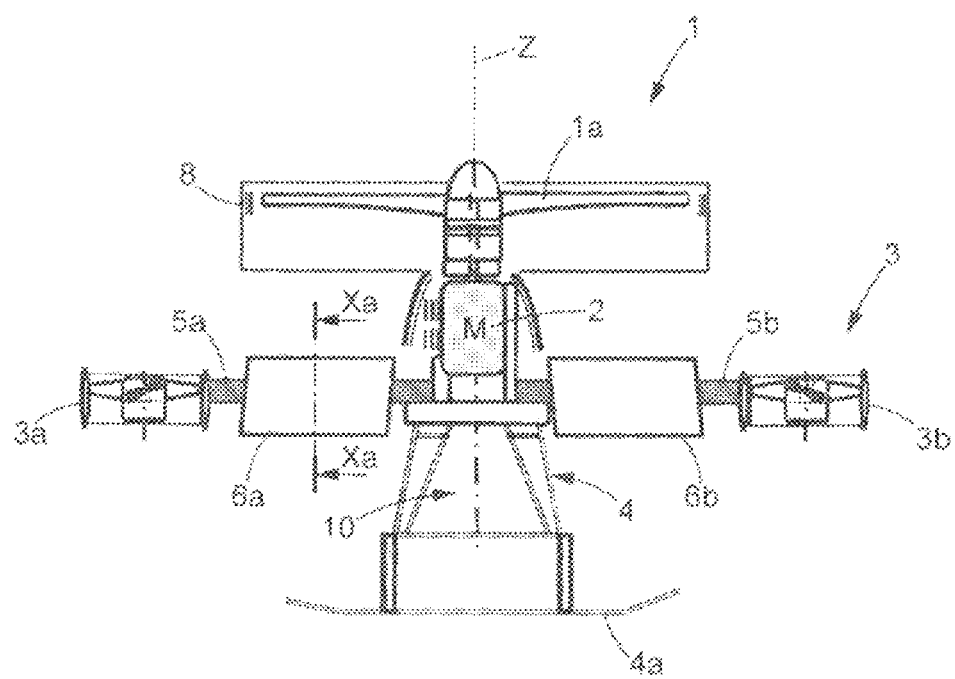
Figure 9A:
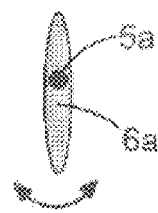

FIGS. 9 and 9a are identical to FIGS. 8 and 8a, with the exception of said supporting blower 1 which, in this case, only comprises a single multi-blade propeller 1a. The lift-generating efficiency is not as good in this case as in the configuration in FIG. 8, and the drive torque of the single propeller 1a, which is not balanced by that of a contra-rotating propeller, must be compensated for at the level of the orientable flaps 6a, 6b, 6c, 6d (6c and 6d being supported by the perpendicular arms 5c and 5d, which are not shown). This configuration, which has a lower lift-generating performance, nevertheless makes it possible to simplify the architecture of the aerodyne: no contra-rotating propeller, no contra-rotating transmission gearbox. However, the flaps 6a, 6b, 6c, 6d must be overdimensioned in order to balance the engine torque. In order to achieve this aim, the flaps can be doubled as shown in FIG. 10, but this configuration is much less stable than the previous one.

Figure 10:
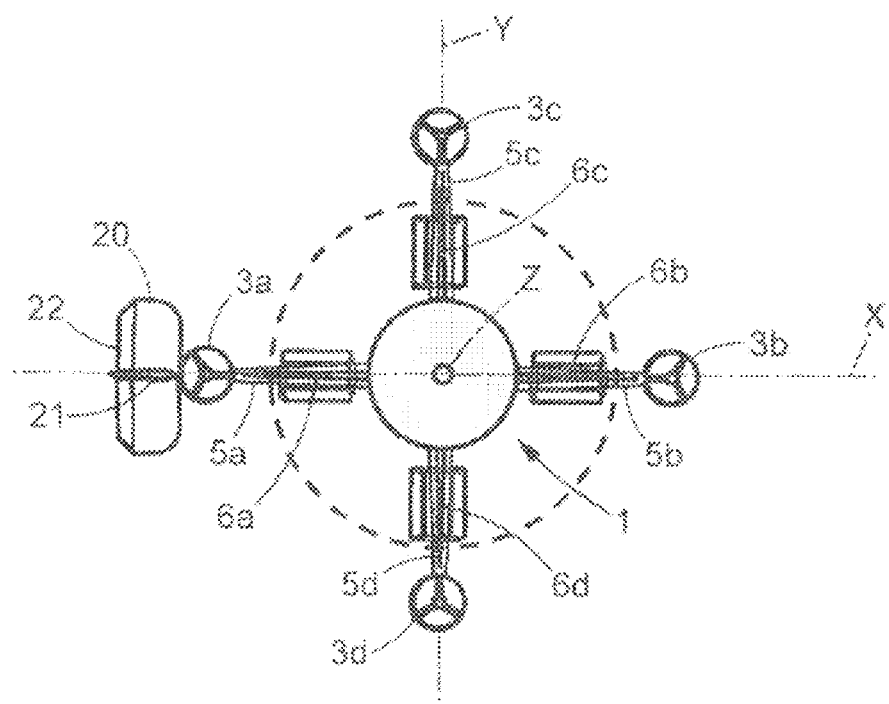
Figure 11:
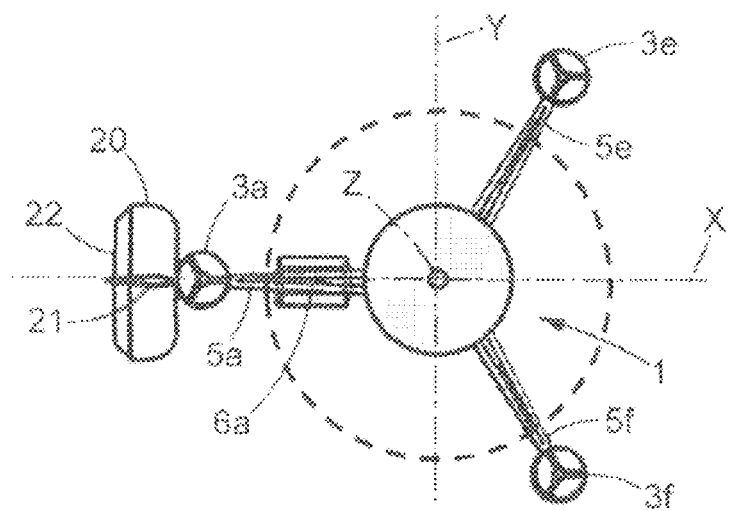

FIGS. 10 and 11 are top views of two examples of aerodynes according to the invention with four (FIG. 10) or three (FIG. 11) supporting arms 5a-5d or 5a, 5e, 5f, with four or three attitude blowers 3a-3d or 3a, 3e, 3f with a rear empennage in order to ease the work of the attitude blower 3a and/or pitch flaps 6c and 6d during a horizontal translational movement of the aerodyne. In its simplest configuration, the empennage comprises only a horizontal empennage 20 mounted pivoting about an axis parallel to the pitch axis Y. In other versions, it can comprise a vertical empennage 21 in order to orientate itself facing into the wind and/or a lift flap 22 hinged on the rear of the horizontal empennage 20 in order to accentuate its camber and increase its lift. In these two FIGS. 10 and 11, the flaps 6a, 6b, 6c and 6d shown are doubled relative to those in FIGS. 8 and 9. This may be necessary, especially under the hypothesis of a supporting blower 1 with a single propeller 1a like that in FIG. 9, which requires a balancing torque in terms of yaw that is greater than in the case of a supporting blower 1 with two contra-rotating propellers such as 1a and 1b in FIG. 8 for example.

Figure 12:
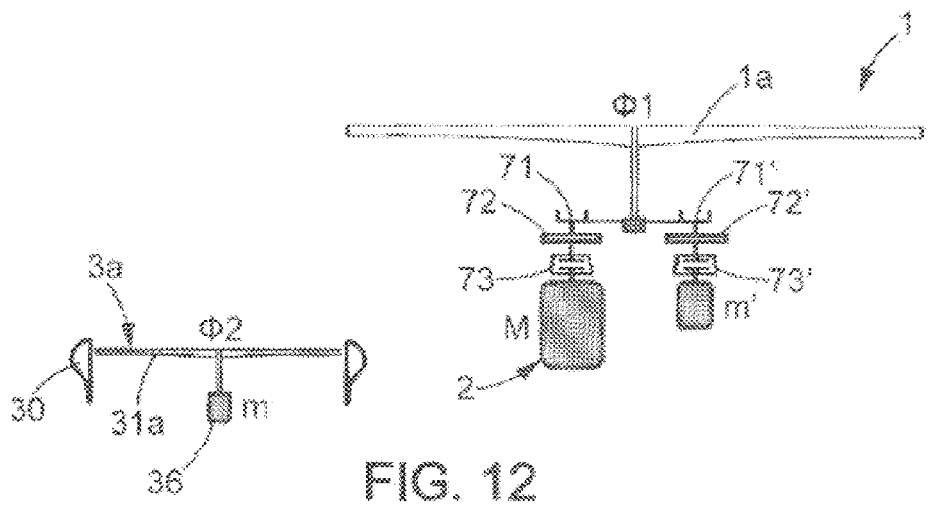

FIG. 12 is a diagrammatic view of a supporting blower 1 that is unfaired, with a single propeller 1a of diameter Φ1 driven by a power train 2 with a main drive heat engine M, which comprises, for emergency or auxiliary purposes (for temporary use), a small electrical motor or heat engine m' via a clutch 73 and/or 73', a freewheel 72 or/and 72' and a transmission 71 or/and 71' according to whether the drive is carried out by the engine M or the motor or engine m' or both simultaneously, and attitude blowers of which a single electrical blower 3a is shown with its electrical motor m, and a single propeller 31a of diameter Φ2 and its fairing 30. The small motor m' has a lower power than that of the main engine M, for example of the order of 25% to 50% of that of the engine M. In this case, in the event of breakdown of the main engine M, the survival of the aerodyne, with its payload, is ensured by the small motor m', capable in an emergency and for several minutes' flight, and with the assistance of the set of electrical blowers 3, of which only the blower 3a is shown here, of rescuing the aerodyne by allowing an emergency landing. In normal operation, the lift-generating propeller 1a is driven by the engine M via the clutch 73, the freewheel 72, and the transmission gearbox 71 if the motor m' is out of service. The engine M is started, then engaged; it can then rotate the propeller 1a at the desired rotational speed by means of the transmission gearbox 71 and, in the event of the engine M stopping, the freewheel 72 ensures that the propeller 1a is not stopped abruptly. If the small motor m' has not already been started and is driving the propeller 1a through the clutch 73', the freewheel 72' and the transmission 71', which adds its power to that of the engine M supplied through the transmission 71; when the engine M fails, the small motor m' is started, so that its power is transmitted to the propeller 1a, and all the attitude blowers such as 3a are driven continuously and as far as possible at full power in order to ensure lift-generation, to an extent compatible with the stabilization of the aerodyne, in order to rescue it with its payload.

If the small motor m' is electrical it can, with the assistance of the electrical attitude blowers such as 3a, contribute additional power that is insensitive to altitude and therefore allow an operation at altitude to be correctly carried out. For these operations, the ratio of the total surface area A2 of the attitude blowers such as 3a to the surface area A1 of the supporting blower 1 is comprised between 60% and 100% and preferably is such that A2/A1>70%. In addition, preferably, if p'1 is the power flux density (expressed in $KW/m^2$) of the small motor m', that is Pm'/A1, where Pm' is the power of the motor m', and p2 is the power flux density of the attitude blowers such as 3a, that is Pm/A2, where Pm is the sum of the power of the motors m of all the attitude blowers, similar values are chosen for p'1 and p2. For example, p'1 and p2 satisfy the following double inequality: 0.5× p'1<p2<1.5×p'1. Of course, the same pattern would be possible with two contra-rotating propellers 1a and 1b of diameters Φ1 instead of 1a and two electrical propellers 31a and 31b of diameters Φ2, faired or unfaired, instead of 31a.

Figure 13:
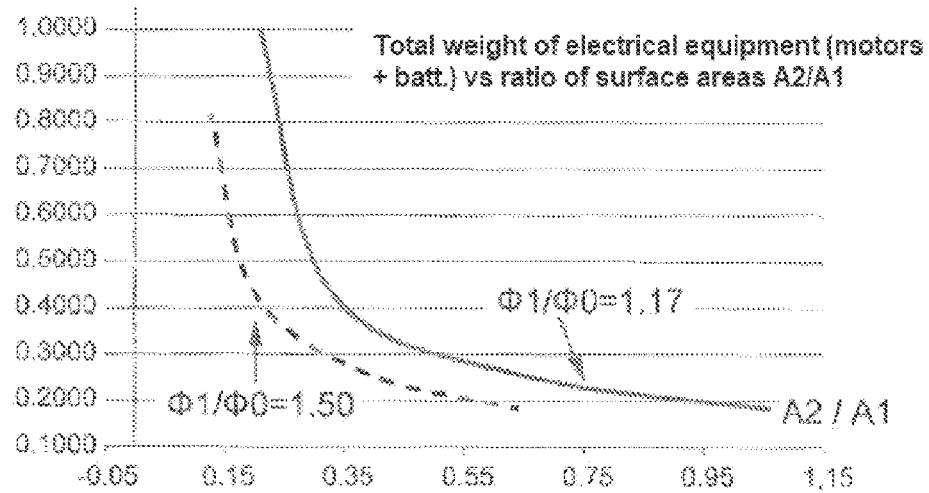

FIG. 13 is a diagram showing the change in an index proportional to the weight of the set of electrical equipment ((weight of the electrical motors+weight of the batteries) divided by a reference weight representative of the payload under certain conditions), in two configurations of diameter 41 of the supporting blower 1 (curves Φ1/Φ0=1.17 and Φ1/Φ0=1.50) where Φ0 is a minimum reference diameter, as a function of the choice of the ratio of surface areas between the total surface area (A2) of the electrical attitude blowers 3 and the surface area (A1) of the supporting blower 1. It is noted that:

the greater the diameter Φ1, the more favourable the situation (the aforementioned weight index is reduced), but this option has limits, because the greater Φ1/Φ0, the greater the increase in the space requirement of the aerodyne, as well as the problems of structural strength;

the curves are strongly non-linear: below a minimum ratio of A2/A1 (approaching 40%), the weight index diverges; this is a very important point of the invention, since in fact the invention makes the choice of organizing the survival situation by dimensioning the electrical attitude blowers 3, also called stabilization and/or survival blowers, in order to support at least the weight of the aerodyne without payload, but the condition for achieving this objective is to have a total surface area A2 that is very significant with respect to the surface area A1. In fact, if the surface area A2 is too small with respect to A1, the power of the electrical motors 36 (*m*) of the attitude blowers must be increased in order to compensate for this weakness, which increases both the weight of the motors 36 (*m*) and that of the batteries supplying power to them, and "ultimately" increases the load, therefore the power of the motors 36. This situation can get out of hand and lead to dimensioning where the payload is entirely taken up by the weight of the electrical motors 36 (*m*) and the associated batteries.

In order to obtain an optimal weight of electrical equipment (motors 36+batteries), while retaining a reasonable size of the supporting blower ($\Phi1/\Phi0<1.2$), the ratio A2/A1 must preferably be greater than 70%.

Figure 14:
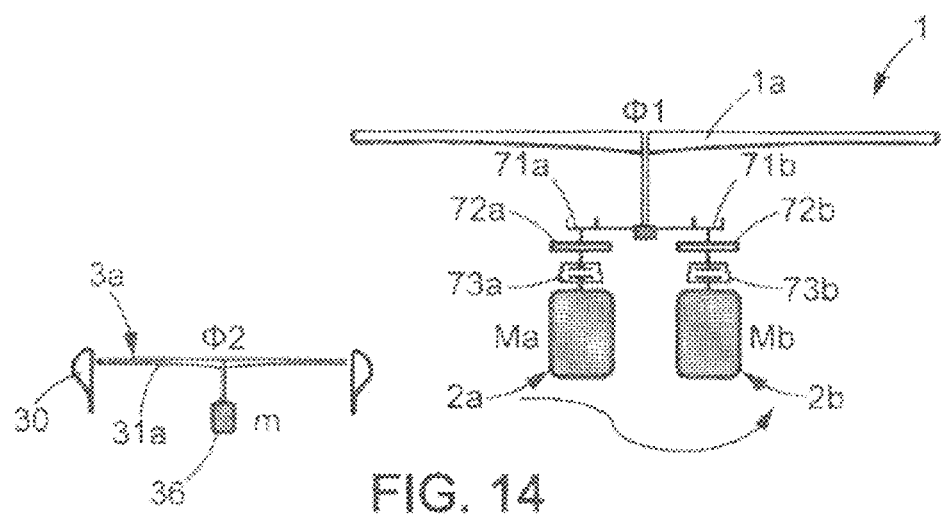

FIG. 14 is a diagrammatic view of a supporting blower 1 with a multiblade propeller 1*a* of diameter $\Phi1$ with a power train having two main drive engines (Ma, Mb) 2*a* and 2*b*, each of which is connected to the supporting blower 1 by a transmission gearbox 71*a* or 71*b*, a freewheel 72*a* or 72*b*, a clutch 73*a* or 73*b*, and an electrical blower 3*a* with its motor 36 (*m*), a propeller 31*a* of diameter $\Phi2$ and its fairing 30. In this embodiment, in the event of breakdown of one of the main engines 2*a* (Ma) or 2*b* (Mb), the survival of the aerodyne, optionally without payload, is ensured by the engine remaining operational and by the set of electrical blowers 3, of which only one, 3*a*, is shown here. Under normal operation, the lift-generating propeller 1*a* is therefore driven by the engines 2*a* (Ma) and 2*b* (Mb) via two clutches 73*a* and 73*b*, two freewheels 72*a* and 72*b*, and two transmission gearboxes 71*a* and 71*b*. Each engine 2*a* or 2*b* is started, then engaged; one of the two engines 2*b* (Mb) in FIG. 14 is in a "master-slave" relationship symbolized by an arrow in FIG. 14, relative to the "master" engine, i.e. its speed and delivered power are "copied" from those of the "master" engine. In order to ensure symmetrical wear on the engines 2*a* (Ma) and 2*b* (Mb) and on the equipment, the roles of master and slave will be changed between the two engines at regular intervals. These engines 2*a* and 2*b* then rotate the propeller 1*a* at the desired rotational speed by means of the transmission gearboxes 71*a* and 71*b*, and, in the event of one of the engines stopping, the freewheel 72*a* or 72*b* allows the propeller 1*a* to continue to be driven by the operational engine without being braked by the stopped engine. The engine 2*a* (Ma) or 2*b* (Mb) remains operational and the set of electrical blowers 3, also called survival blowers, then ensure the rescue of the aerodyne and its payload. Of course, the same scheme is possible with two contra-rotating propellers 1*a* and 1*b* of diameters $\Phi1$ in the supporting blower instead of the single propeller 1*a* and two electrical attitude propellers 31*a* and 31*b*, faired or unfaired, of diameters 42, instead of the single propeller 31*a* in each attitude blower such as 3*a*.

Figure 15:
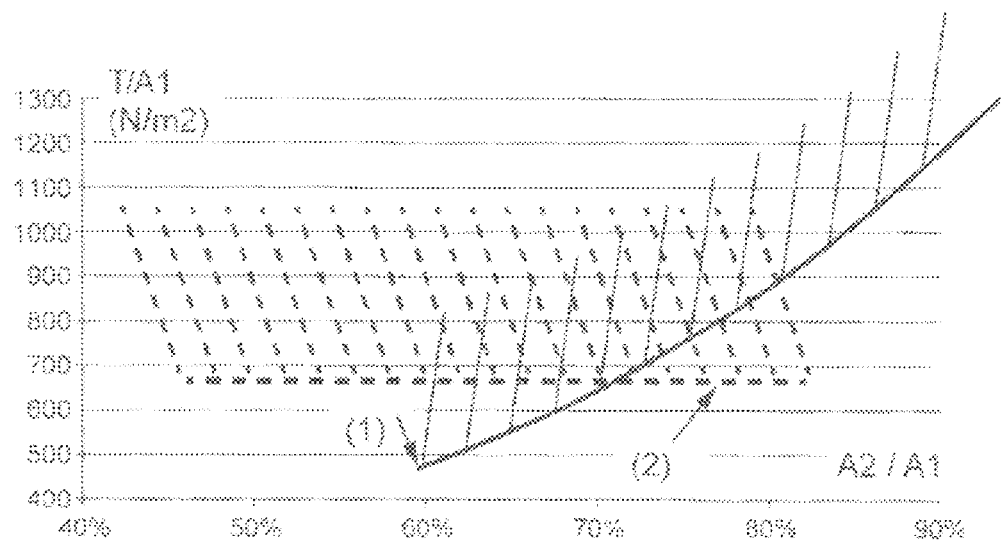

FIG. 15 is a diagram showing exclusion areas as a function of the choices of rotor load (T/A1), T being the maximum load of the aerodyne, and ratio (A2/A1) of surface areas between the total surface area A2 of said electrical stabilization and/or survival blowers 3 and the surface area A1 of the main blower 1. Advantageously, the disc loading (T/A1) of the supporting blower 1 is comprised between 450 N/m2 and 750 N/m2 (curve (2)). Advantageously, the ratio of the surface areas A2/A1 between the total surface area A2 of the attitude blowers 3 and the surface area A1 of the supporting blower 1 is greater than 70%.

Figure 16:
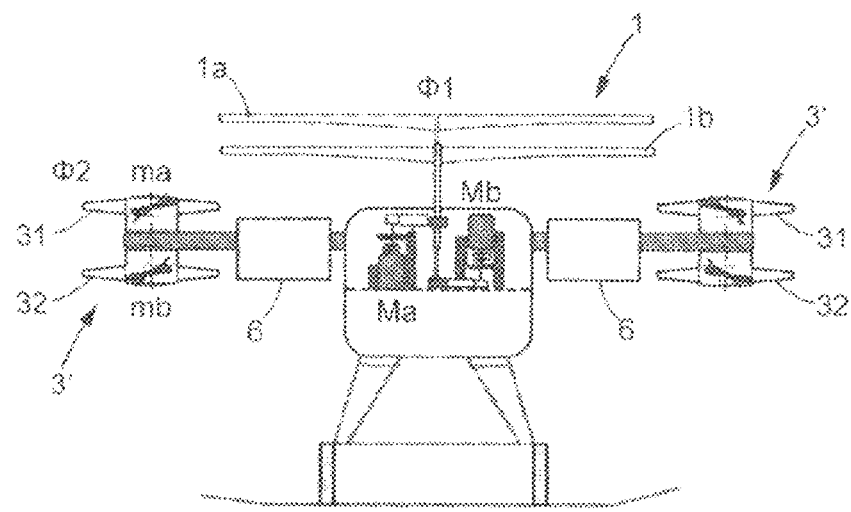

FIG. 16 is a diagrammatic side view of an example of an aerodyne according to the invention. The aerodyne is similar to the one in FIG. 14, but with the following differences:

the supporting blower 1 comprises two coaxial contra-rotating propellers 1*a* and 1*b* that are unfaired and have the same diameter $1 and the electrical stabilization and/or survival blowers 3' comprise coaxial contra-rotating propellers 31 and 32 that are unfaired and have the same diameter $\Phi2$, which are themselves each driven by one of the two electrical motors ma and mb, respectively. Alternatively, the two propellers 31 and 32 can be driven collectively by one or more electrical motors with a contra-rotating transmission (not shown in FIG. 16).

The two drive trains Ma and Mb each drive one of the two propellers 1*a* and 1*b* of the supporting blower 1 respectively, in an independent but synchronized fashion. This makes it possible to avoid a contra-rotating transmission. If necessary, it is also possible to dispense with the freewheels, since stopping one of the two engines (Ma and Mb) does not affect the operation of the other engine and the propeller associated therewith.

Finally, the flaps 6 are overdimensioned in order to balance the drive torque of a single propeller 1*a* or 1*b* in a survival situation with one of the two engines Ma and Mb broken down.

Figure 17:
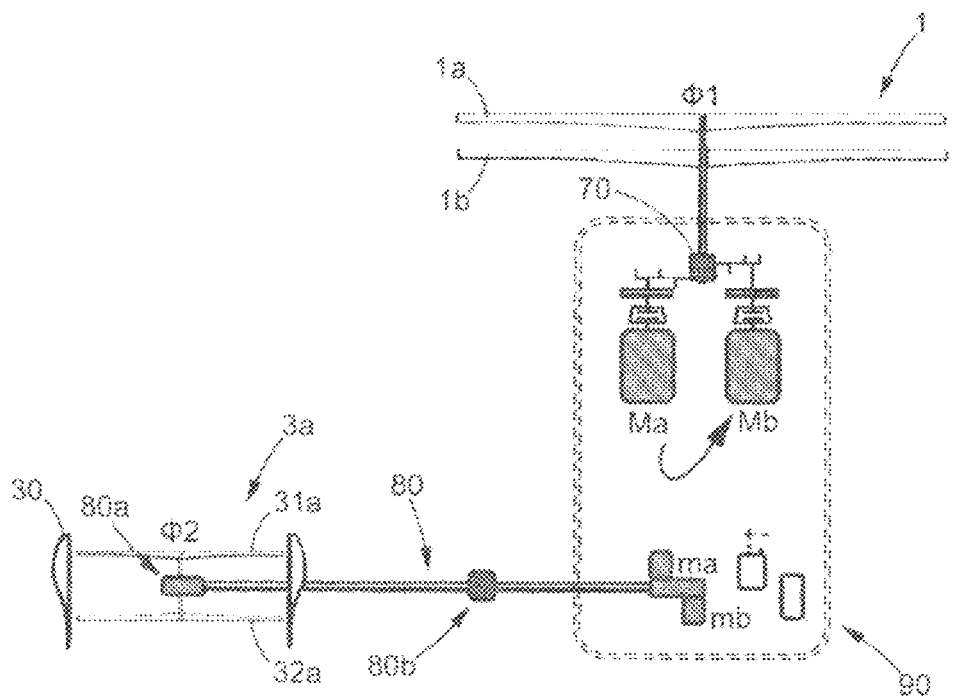

FIG. 17 is a diagrammatic view of the supporting blower 1 driven by two drive trains Ma and Mb and associated with faired electrical attitude blowers, of which only one blower 3*a* is shown with its components. In this version of the aerodyne, the main points which distinguish it from the architecture described with reference to FIG. 16 are:

each of the two drive trains Ma and Mb drive the set of two coaxial contra-rotating propellers 1*a* and 1*b* of the same diameter $\Phi1$ via a single contra-rotating transmission gearbox 70. The drawbacks of this architecture relative to that in FIG. 16 are, on the one hand, the need to have a contra-rotating transmission (high weight and cost) and, on the other hand, the need to have perfect synchronization between the two engines Ma and Mb under a "master-slave" logic as explained above (symbolized by the arrow between Ma and Mb in FIG. 17);

but the main advantage is that, in the case of breakdown of one of the engines Ma and Mb, the engine remaining operational can drive the two propellers 1*a* and 1*b* in contra-rotating rotation, instead of a single propeller as for FIG. 16, and thus with balanced torques and with a better lift-generating efficiency.

The electrical axial blowers such as 3*a* are faired and equipped with two coaxial contra-rotating propellers 31*a* and 31*b*, of the same diameter T2, therefore with optimum lift-generating efficiency.

In this example, each of the two propellers 31*a* and 32*a* of the attitude blower 3*a* is driven by one of two small, preferably identical, electrical motors $m_a$ and $m_b$, respectively.

The main electrical and, optionally, electronic components, in particular the electrical motors $m_a$ and $m_b$, their power supply batteries, controllers for controlling these motors and batteries, connectors for connecting the motors to the batteries, as well as one or more alternators (not shown in the figures) for recharging the batteries, driven from one or more heat engines, are grouped with the main engines of the drive trains Ma and Mb and the transmission gearbox 70, in a thermostatically controlled closed enclosure 90, in the central portion of the supporting structure 4, in which the electrical components are close to one another, which facilitates the transmission between them of electrical currents, the intensities of which can reach several hundred amps. Each of the electrical motors m$_a$ and m$_b$ in the enclosure 90 is connected by a mechanical transmission with a rotating shaft 80 to a mechanical angle transmission 80a, mounted in the centre of the attitude blower 3a, for driving propellers 31a and 32a in contra-rotating rotation respectively by motors m$_a$ and m$_b$. Each shaft 80 is equipped with a universal joint transmission 80b making it possible to hinge or fold back a portion of the rotating shaft 80 with a portion of the corresponding supporting arm 5a along the supporting structure 4, in order to reduce the space requirement of the aerodyne when on the ground and when being placed in a hangar or transported on land.

Figure 18:
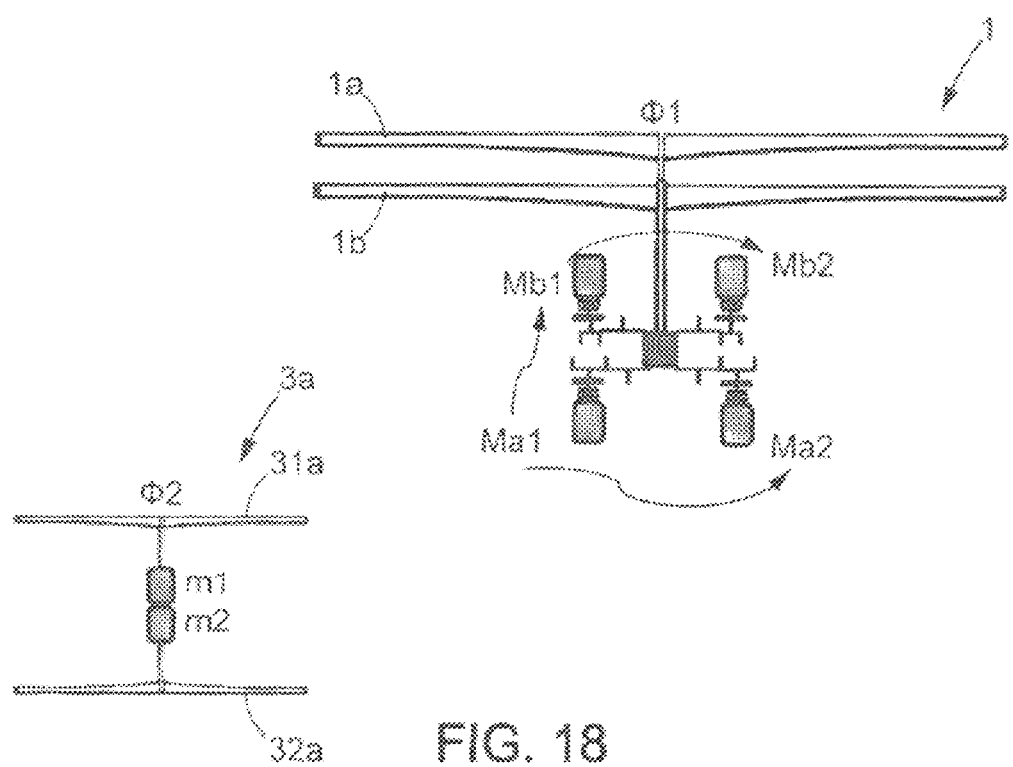

FIG. 18 is a diagrammatic view of an architecture of the aerodyne according to the invention which is similar to the one in FIG. 16, except that there are two pairs of motors or engines Ma1, Mb1 and Ma2, Mb2, each for driving one of the two propellers 1a and 1b of the supporting blower 1, respectively. The "master-slave" relationship still applies here, symbolized by the arrows in FIG. 18, but it involves transitivity both between the two motor or engine groups Ma1, Mb1 and Ma2, Mb2 and, inside each motor or engine group, from Ma1 to Mb1 and from Ma2 to Mb2. Of course, it would be possible to multiply the number of motors or engines in each group and have more than two of them per group.

The invention claimed is:

1. Vertical take-off and landing aerodyne, of the type known as VTOL, comprising:
    a supporting structure (4), to which are structurally connected:
    at least one supporting axial blower (1), with an axis of rotation (Z) that is substantially vertical and fixed relative to said supporting structure (4), and generating lift of the aerodyne,
    at least one motor-lift unit, comprising at least one main drive motor or engine (2) of said supporting blower (1),
    at least three attitude blowers (3), controlling the attitude of the aerodyne in terms of roll and pitch, each attitude blower (3) having an electrical motor, wherein each attitude blower (3 attached, respectively, to one of a plurality of elongate arms (5) that are distributed in a laterally, outwardly projecting manner around said supporting structure (4), to which each arm (5) is connected by an end portion called inner, so that the axis of rotation of each attitude blower (3) is fixed relative to said supporting structure (4), and that all the attitude blowers (3) are located outside the space centrally occupied by said supporting blower (1),
    at least one battery for supplying power to the electrical motors of the attitude blowers (3),
    a landing gear (4a), attached under said supporting structure (4), and
    at least one nacelle (10), for holding a payload,
wherein yaw control flaps with adjustable angle of attack (6) are supported by at least one of the arms (5) supporting attitude blowers (3).

2. Aerodyne according to claim 1, wherein said at least one main drive motor (2) of said supporting blower (1) is an internal combustion engine.

3. Aerodyne according to claim 1, wherein said supporting blower (1) is a blower comprising two coaxial contra-rotating multiblade propellers (1a, 1b), with fixed or collectively variable pitch.

4. Aerodyne according to claim 1, wherein the centre of gravity of said at least one main drive motor (1) is located vertically below said supporting blower (1) and above the plane formed by propellers (31) of said attitude blowers (3).

5. Aerodyne according to claim 1, wherein a further motor (m'), of lower power than that of said at least one main drive motor (M) of said supporting blower (1 is associated with said main motor (M), by a transmission enabling application of the sum of the power of said main motor (M) and said further motor (m') to the supporting blower (1), or, in the case of breakdown of said main motor (M), the power of the further motor (m') only so that the supporting blower (1) is then assisted by the attitude blowers (3), the electrical motors of which are dimensioned in order to allow the takeover of the aerodyne with the payload.

6. Aerodyne according to claim 1, wherein the attitude blowers (3a, 3b, 3c, 3d) are faired blowers, and at least one supporting blower (1) is not faired.

7. Aerodyne according to claim 1, wherein the attitude blowers (3', 3'a) are unfaired blowers, similarly to said at least one supporting blower (1.

8. Aerodyne according to claim 6, wherein each attitude blower (3a, 3') comprises two coaxial contra-rotating multiblade propellers (31a, 32a; 31, 32), each driven by one of two electrical motors (m$_a$, m$_b$) respectively, or collectively by one or more electrical motors.

9. Aerodyne according to claim 1, wherein the total surface area (A2) of the attitude blowers (3) is greater than 35% of the surface area (A1) of said supporting blower (1).

10. Aerodyne according to claim 1, wherein said motor-lift unit comprises at least two motors or engines (Ma, Mb) or motor or engine groups having substantially equivalent power, each comprising in series, before a power transmission (71a, 71b) to the supporting blower (1), a clutch (73a, 73b) and a freewheel (72a, 72b) so that, when a motor or engine (Ma, Mb) or motor or engine group has broken down, the drive of the supporting blower (1) is ensured by the other motor or engine (Mb, Ma) or motor or engine group by "disengaging" the broken-down motor or engine or motor or engine group.

11. Aerodyne according to claim 10, wherein the two motors or engines (Ma, Mb) or motor or engine groups are managed according to a "master-slave" type control.

12. Aerodyne according to claim 3, wherein each motor or engine or motor or engine group (Ma1, Mb1; Ma2, Mb2) respectively drives one of the coaxial multiblade propellers (1a, 1b) of the supporting blower (1) in a contra-rotating manner, thus avoiding a contra-rotating transmission.

13. Aerodyne according to claim 1, wherein downstream of the multiblade propeller(s) (1a, 1b) of said supporting blower (1), said flaps (6), the angle of attack of which is adjustable, to adjust the airflow recovery at the output of said supporting blower (1) and to adapt the righting torque to the variations in the torque, in response to the drive torque of said propeller or propellers (1a, 1b).

14. Aerodyne according to claim 1, wherein the supporting blower (1) comprises only one multiblade propeller (1a), with a fixed pitch or a variable pitch, without righting means and in that flaps (6a, 6b), the angle of attack of which is adjustable and which are supported by at least one of the supporting arms (5a, 5b) of the attitude blowers (3a, 3b), balance the motor or engine torque.

15. Aerodyne according to claim 1, wherein the faired attitude blowers (3a, 3b, 3c, 3d) are attached to their supporting arms (5a, 5b, 5c, 5d) such that the centres of thrust of the attitude blowers (3a, 3b, 3c, 3d) are substantially in a horizontal plane substantially below the centre of gravity of the aerodyne, so that the moment known as momentum drag, which is exerted on the fairing (30) of the attitude blowers in a side wind situation relative to the centre of gravity, is of little importance.

16. Aerodyne according to claim 1, wherein the payload (W) is suspended by a system (9) articulated in terms of roll and pitch at a vertical level close to the centre of gravity of the aerodyne excluding payload, so as to retain a stable vertical position of the centre of gravity under load in terms of roll and pitch.

17. Aerodyne according to claim 1, wherein the arms (5) bearing attitude blowers (3), when the aerodyne is on the ground.

18. Aerodyne according to claim 1, wherein the disc loading (T/A1) of the supporting blower (1) is comprised between 450 N/m2 and 750 N/m2.

19. Aerodyne according to claim 1, wherein electrical and electronic components of the aerodyne comprising at least the electrical motors (36; m1, m2; $m_a$, $m_b$) and power supply batteries of the attitude blowers (3), as well as controllers for controlling the motors, connectors for connecting said batteries to said motors and at least one alternator for recharging the batteries are grouped in a closed enclosure (90), arranged in a substantially central area of said supporting structure (4), and connected to each attitude blower, for driving at least one propeller therein (31*a*, 32*a*), by a rotating-shaft mechanical transmission (80).

20. Aerodyne according to claim 1, wherein a supporting arm (5*a*) of an attitude blower (3*a*) located in a plane defined by the axis of rotation (z) of the supporting blower (1) and by the axis (x) of longitudinal movement of the aerodyne and behind the aerodyne also bears a horizontal empennage (20), so as to ease the work of said attitude blower (3*a*) in a situation of longitudinal movement of the aerodyne.

21. Aerodyne according to claim 1, wherein the upstream peripheral portion (30*a*) of the fairing (30) of said attitude blowers (3*a*) bulges radially outwards on a periphery of the fairing in a rounded convex profile, reducing the drag coefficient relative to a lateral relative wind, the downstream portion (30*b*) of said fairing (30) having an outer face that is substantially cylindrical with a circular cross-section.

22. Aerodyne according to claim 5, wherein said further motor (m') is an electrical motor wherein power of the further motor and power that of the electrical motors of the attitude blowers (3) contribute additional power is insensitive to altitude during the flight of the aerodyne.

23. Aerodyne according to claim 5, wherein said supporting blower (1) driven by said further motor (m') and said attitude blowers (3) have power flux densities p'1 and p2 such that $0.5 \times p'1 < p2 < 1.5 \times p'1$, respectively.

* * * * *